United States Patent [19]

Takada

[11] 4,371,193
[45] Feb. 1, 1983

[54] BELT ANTI-SLIP DEVICE FOR VEHICLE SAFETY BELT SYSTEMS

[76] Inventor: Juichiro Takada, 3-12-1, Shinmachi, Setagayaku, Tokyo, Japan

[21] Appl. No.: 195,581

[22] Filed: Oct. 8, 1980

[30] Foreign Application Priority Data

Oct. 11, 1979 [JP] Japan .................................. 54-140995
Feb. 18, 1980 [JP] Japan .................................. 55-018463

[51] Int. Cl.³ .......................................... B60R 21/10
[52] U.S. Cl. .............................. 280/806; 242/107.4 A
[58] Field of Search .............. 280/801, 802, 806, 808; 242/107.3, 107.4 R, 107.4 A

[56] References Cited

U.S. PATENT DOCUMENTS

| | | | |
|---|---|---|---|
| 4,262,932 | 4/1981 | Motonami et al. | 280/806 |
| 4,306,735 | 12/1981 | Pfeiffer et al. | 280/808 |
| 4,310,176 | 1/1982 | Furusawa et al. | 280/801 |

Primary Examiner—Richard A. Bertsch
Attorney, Agent, or Firm—Brumbaugh, Graves, Donohue & Raymond

[57] ABSTRACT

An anti-slip device for vehicle occupant restraint system of the type having a control belt and serially arranged lap belt and shouler belt sections joined by a D-ring and a looop in the control belt which is inserted through the restraint belt opening in the D-ring. A lock member is inserted into the loop and is prevented from moving toward a locking position at the restraint belt opening by springs or tear-away stitching. When a predetermined amount of tension is applied to the control belt the springs or stitching yield or break, thus permitting the lock member to move to the restraint belt opening and thereby wedging the restraint belt against the opening and preventing the lap belt section from slipping into the shoulder belt section.

9 Claims, 17 Drawing Figures

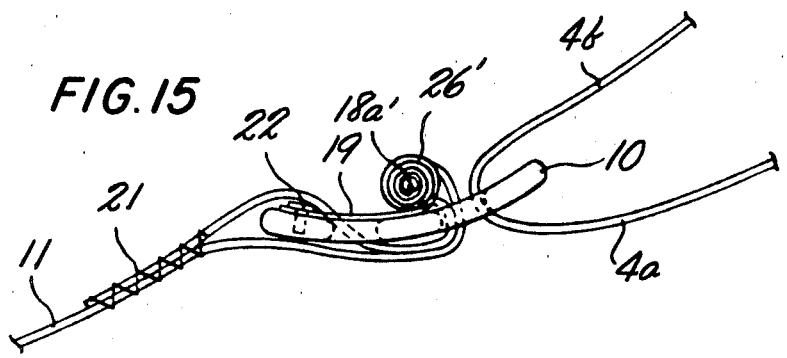
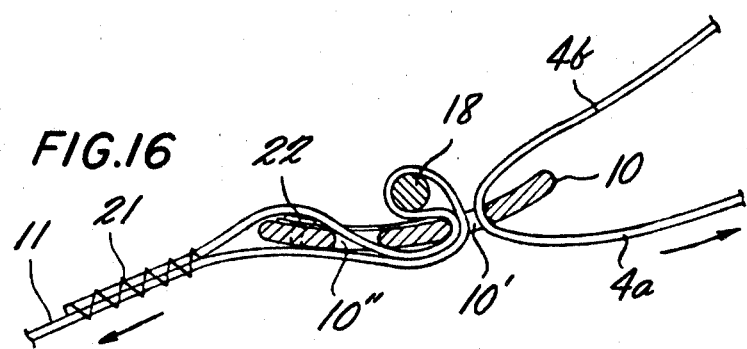
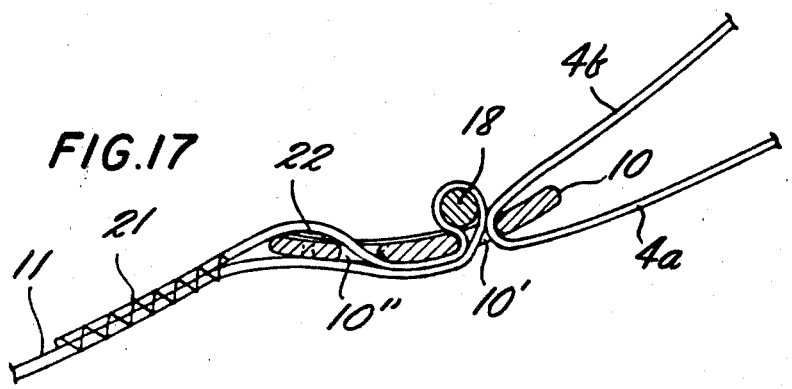

BELT ANTI-SLIP DEVICE FOR VEHICLE SAFETY BELT SYSTEMS

BACKGROUND OF THE INVENTION

This invention relates to an anti-slip device for use in a vehicle occupant restraint belt system having a restraint belt having lap and shoulder belt sections in serial arrangement and a control belt connected to the restraint belt by a "D" ring. The anti-slip device is located at a partitioning point between the lap and shoulder belt sections and is designed to prevent the transfer of the lap belt section toward the shoulder belt section in the event that an accident or other emergency causes the occupant's upper body to lunge forward against the shoulder belt.

In recent years various automatic, passive-type occupant restraining/releasing belt systems have been proposed. It has been found in some passive restraint systems particularly of the type having lap belt and shoulder belt sections that are serially arranged as a continuous restraint belt and in which the restraint belt and the control belt for adjusting the total belt system length are joined with a D-ring, that a part of the belt located at the D-ring slips, permitting an undesirable movement of the lap belt section toward the shoulder belt section. This undesirable movement of the belt in turn permits the upper body of the occupant to move toward the instrument panel, thus increasing the risk of injury.

The applicant has previously proposed anti-slip devices using a spacer member, or a belt support member which is easily broken or deformed during an emergency. These devices are disclosed in Japanese patent applications No. 53-096834 filed July 15, 1978, and No. 53-127044 filed Sept. 18, 1978.

SUMMARY OF THE INVENTION

There is provided, in accordance with the present invention, an anti-slip device for a vehicle occupant restraint belt system including a control belt of the thrupoint type and a restraint belt consisting of a lap belt section and shoulder belt section, characterized in that when tension is applied under emergency conditions to the control belt, a lock member prevents the movement of the lap belt section to the shoulder belt section, thereby restraining the movement of the upper body of the occupant.

In a preferred embodiment a restraint belt is passed through a restraint belt opening in a D-ring and turned back toward itself, forming a lap belt section and a shoulder belt section, the lap belt section being wound into a retractor attached near the lower rear corner of a vehicle door and the shoulder belt section being connected to the upper rear corner of the door by an emergency release tongue and buckle. A control belt leads from a retractor located beneath the vehicle seat, passes up through a guide and has a D-ring at its free end. The control belt is reflexed back toward itself forming a loop, the loop being inserted up through the restraint belt opening in the D-ring and the terminal end of the control belt being stitched to the incoming part of the control belt. A lock member is inserted into the control belt loop, and temporary stitching or springs are attached to the loop to prevent the lock member from moving toward the restraint belt opening. When a predetermined amount of tension is applied through the belt, the temporary stitching or springs break or yield, and the lock member moves into the restraint belt opening, wedging the restraint belt against the edge of the opening and thereby preventing the lap belt section from moving toward the shoulder belt section.

BRIEF DESCRIPTION OF THE DRAWINGS

FIG. 15 is a side view of the arrangement shown in FIG. 13;

FIGS. 16 and 17 illustrate the operation of the arrangement in FIG. 13.

DETAILED DESCRIPTION OF AN EXEMPLARY EMBODIMENT

Figure 1:
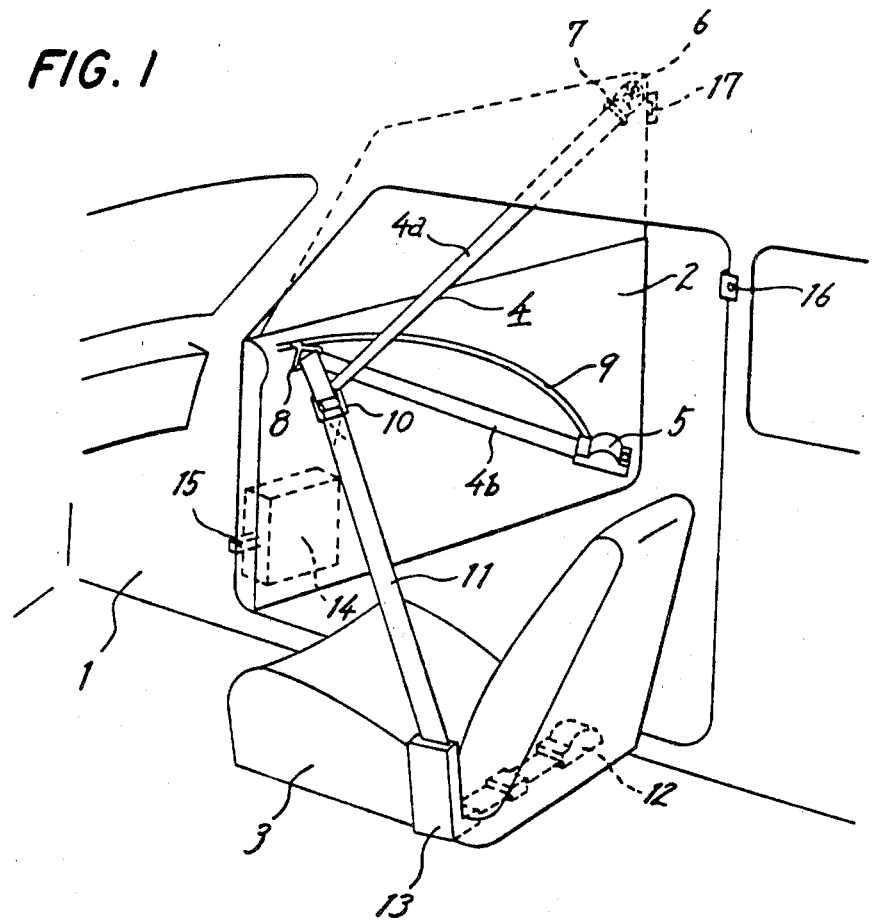
FIG. 1 is a pictorial view of a passive type seat belt assembly incorporating the anti-slip device.

The restraint belt system shown in FIG. 1 is associated with a door 2 that is hinged along its front end to the vehicle body 1 and employs a single, continous restraint belt 4 having a shoulder belt section 4a and a lap belt section 4b in serial arrangement. The lower end of the belt is wound in a retractor 5 fitted at a position near the interior lower rear corner of the door 2. The upper end of the belt is connected by an emergency release buckle 6 and tongue 7 to the interior upper rear corner of the door 2. At a point between the D-ring 10 and the retractor 5 the belt passes slidably through a guide ring 8. The guide ring 8 is carried on a guide rail 9 on the interior surface of the door 2 for movement between a forward restraining and a rearward position along the guide rail 9 and is driven by a driving mechanism 14 including a motion input lever 15 that is responsive to the opening and closing motions of the door 2.

A control belt 11 leads from a retractor 12 located beneath the vehicle seat 3. The control belt 11 passes through a belt guide 13 located on the inboard side of the seat. The belt guide 13 guides the control belt 11 up to the rearward inboard part of the seat from which it leads to the D-ring 10 to which its free end is affixed.

Figure 2:
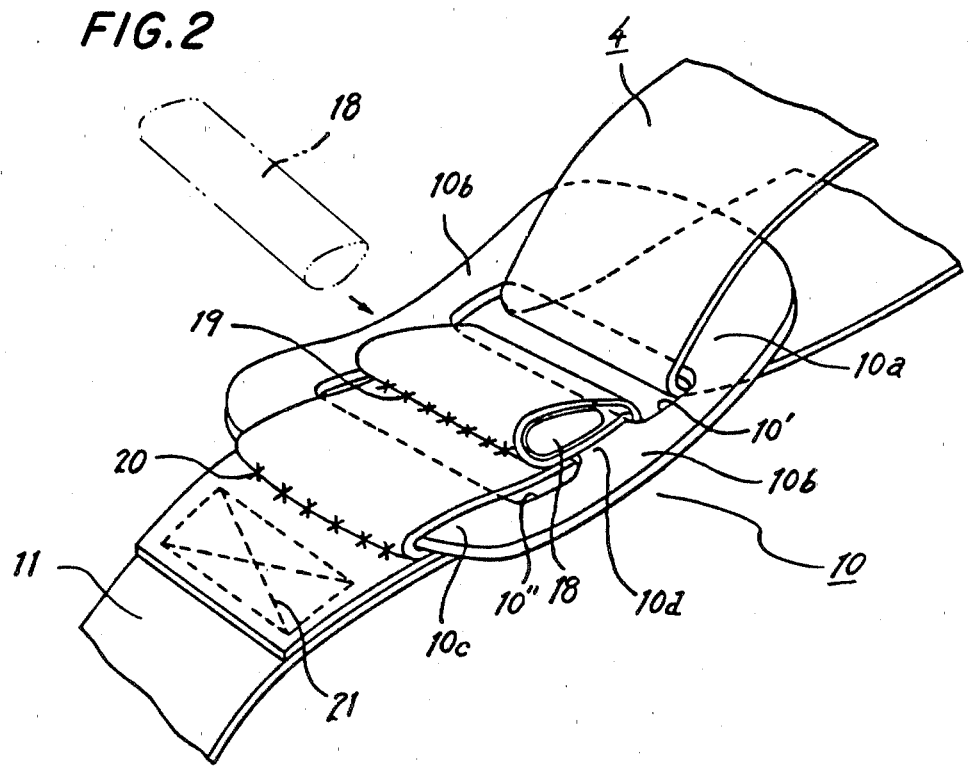
FIG. 2 is a pictorial view of an embodiment of the anti-slip device.
Figure 3:
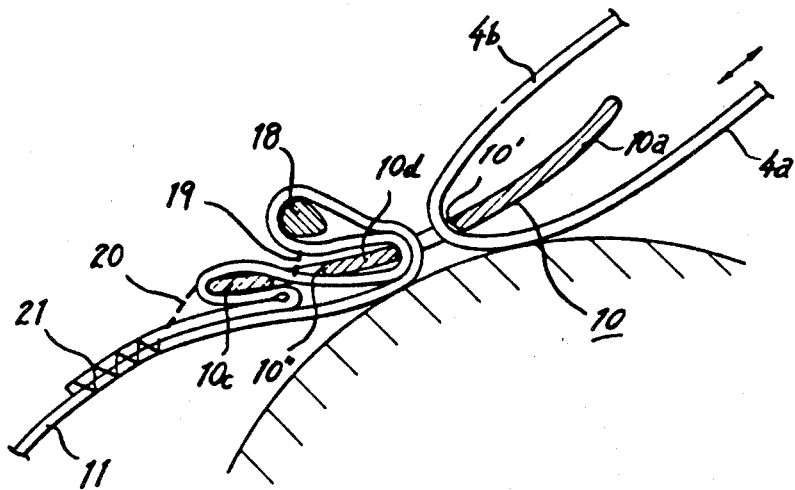
FIGS. 3 and 4 are cross-sectional views that show the belt locking function of the embodiment of FIG. 2.
Figure 4:
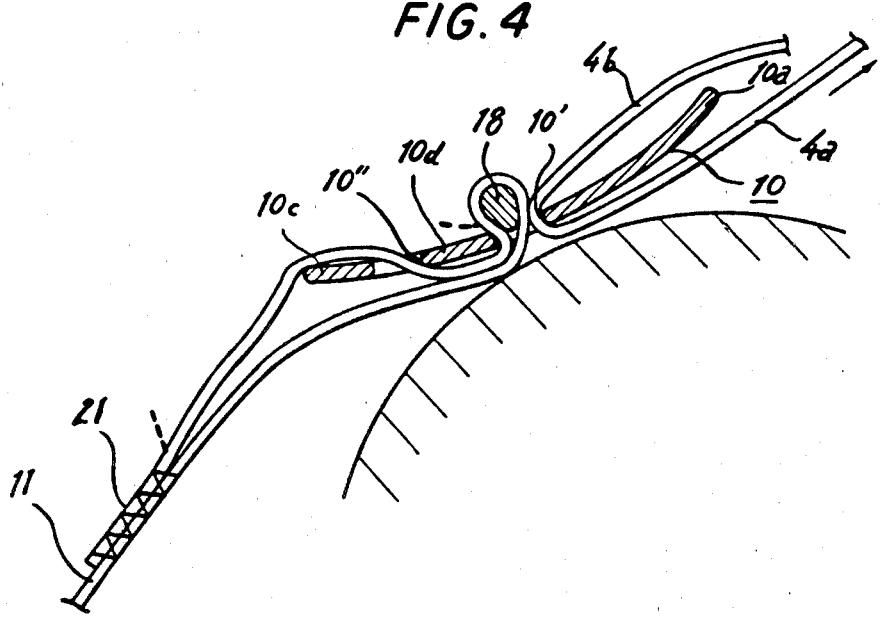

Referring now to the embodiment illustrated in FIGS. 2-4 the D-ring 10 comprises a reflex section 10a, a bridge section 10d which bridges both sides 10b, 10b and an end section 10c which closes the two side sections 10b, 10b against the reflex section 10a. Open spaces 10' and 10" are provided in the D-ring 10, a first open space 10' being a restraint belt opening located between the reflex section 10a and the bridge 10d, and a second open space 10" being a control belt opening located between the bridge 10d and the end section 10c.

The shoulder belt section 4a the belt 4 enters the restraint belt opening 10' of the D-ring between sections 10a and 10d from the underside of the section 10a and emerges out and upward to become the lap section 4b. The free end of the control belt 11 leads from the retractor 12 through the belt guide 13 and enters the control belt opening 10' from the underside of the D-ring 10, leads out and upward and is folded back to form a control belt loop and enters the opening 10' downward, passes along the underside of the bridge section 10d and enters the control belt opening 10", emerges from the control belt opening 10" and is stitched to the incoming position of the control belt 11 by stitching 21. A lock member 18 is inserted in the control belt loop above the bridge section 10d.

Furthermore, another loop of the control belt 11 is formed between the bottom surface of the end section 10c of the D-ring and the upper surface of the incoming position of the control belt 11. Both U-shaped loops have temporary stitching 19 and 20 which is designed to tear away in the event of an emergency, as is more fully discussed below.

The size of the lock member 18 is such that the control belt loop in which it is inserted cannot pass through the restraint belt opening 10'. As can be seen in FIG. 3, under normal circumstances the temporary stitching 19 and 20 remains intact, and the lock member 18 is restrained from moving toward the restraint belt opening 10'. In the event of an emergency that generates a predetermined force in the control belt, the temporary stitching 19 and 20 breaks. Once the stitching threads have been broken, the lock member 18 is permitted to move into the restraint belt opening 10' in the D-ring, locking both belts 4 and 11 by wedging action at the restraint belt opening 10', as is illustrated in FIG. 4, thus preventing movement of the lap belt section 4b toward the shoulder belt section 4a, which in turn restrains the movement of the upper body of the occupant.

Figure 5:
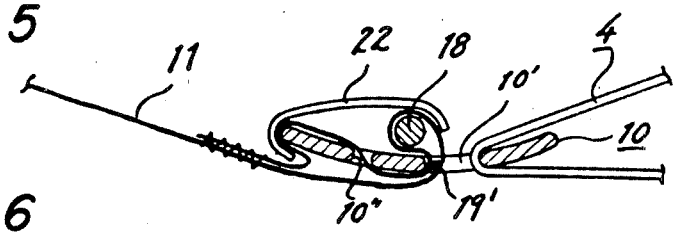
FIGS. 5-9 are cross-sectional views that show the manner of arranging the control belt in the D-ring and various modifications in the manner of fixing the U-shaped control belt loop temporarily with tear-away stitching.
Figure 6:
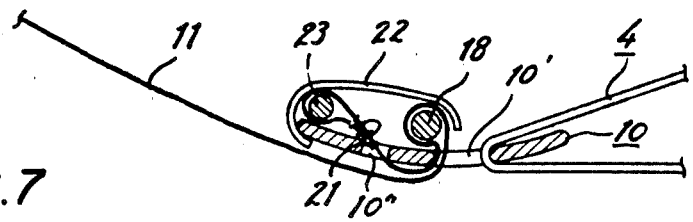

FIGS. 5–9 illustrate various ways in which the control belt 11 may be passed through the restraint belt opening 10' of D-ring 10. In FIGS. 5 and 6 lock member 18 is enclosed within a cover 22 which is hooked at one end to remain at the end section 10c of D-ring 10. In FIG. 5 the temporary stitching 19, 20 of FIGS. 2–4 is replaced by single temporary stitching 19' which acts in a manner similar to the stitching 19, 20 of FIGS. 2–4.

In FIG. 6 there is provided a second U-shaped control belt loop enclosing a corresponding locking wedge member 23, this second reflexed belt section being fixed with temporary stitching 21 after passing through the opening 10'.

Figure 7:
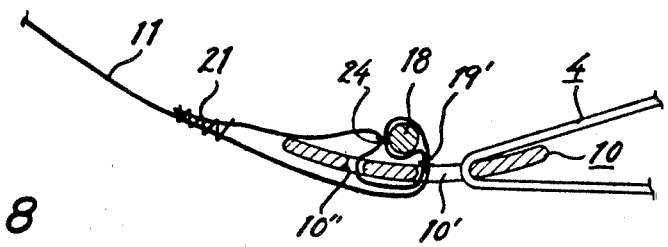

In another embodiment, as illustrated in FIG. 7, temporary threads 19' and 24 are provided at the outside surfaces of the control belt loop enclosing the lock member 18.

Figure 8:
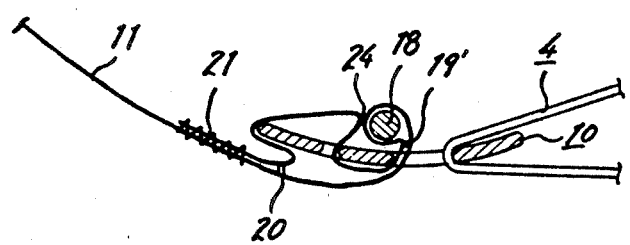

In yet another embodiment, as illustrated in FIG. 8, temporary threads 20 are provided in addition to temporary threads 19' and 24, the temporary threads located underneath D-ring 10 and connecting the incoming and terminal ends of the control belt 11.

Figure 9:
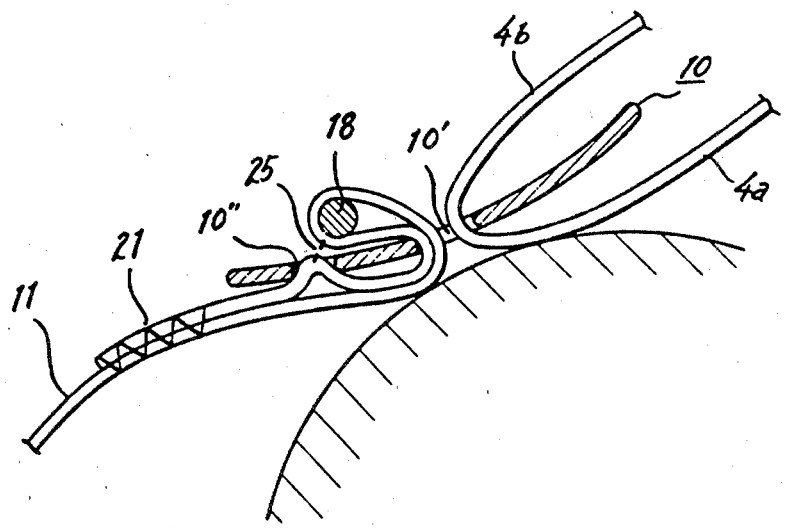

As illustrated in FIG. 9, a single temporary thread 25 is provided near the control belt opening 10", one end being nearly adjacent to the terminal end 21 of the control belt 11 and the other being attached to the control belt loop enclosing the lock member 18.

It will be understood by one skilled in the art that the lock member 18 functions in all of the above described embodiments in a manner similar to that described above and shown in FIGS. 3 and 4.

Figure 10:
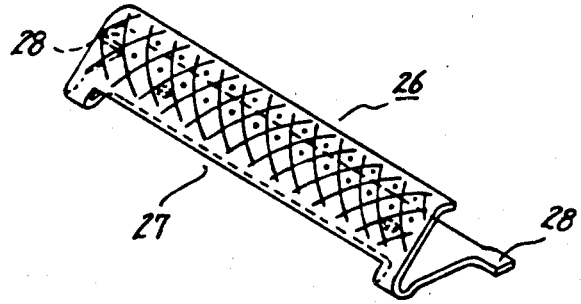
FIG. 10 is a pictorial view of a V-shaped member which may be used in the device for additional locking action.
Figure 11:
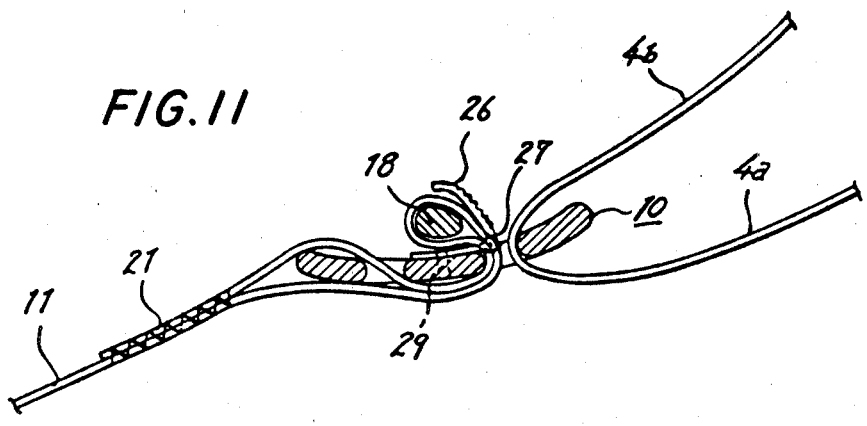
FIGS. 11 and 12 are cross-sectional view of an embodiment incorporating the V-shaped member of FIG. 10 in the non-locking and locking positions.
Figure 12:
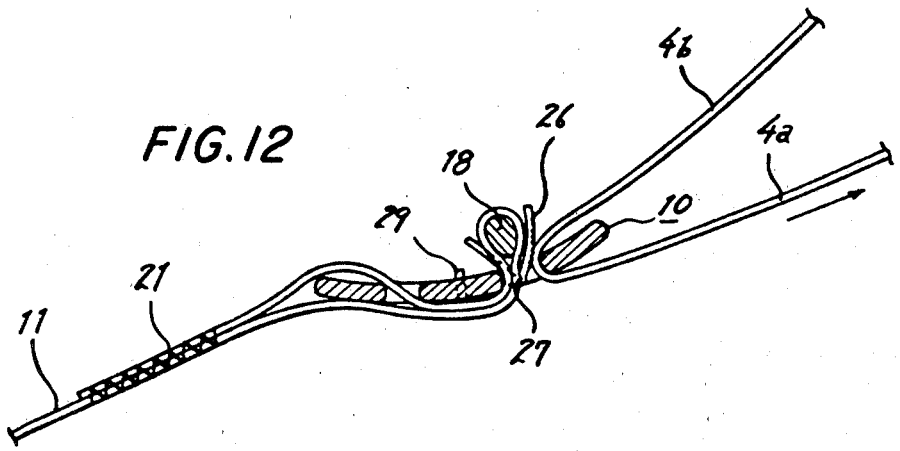
Figure 13:
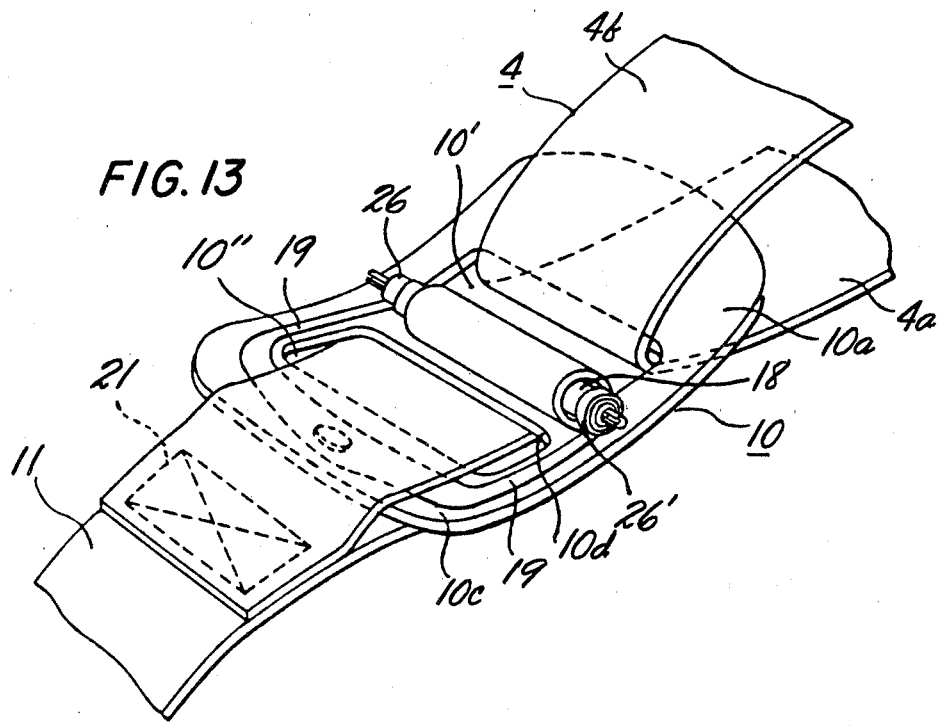
FIG. 13 is a perspective view of still another embodiment incorporating springs instead of temporary stitching.
Figure 14:
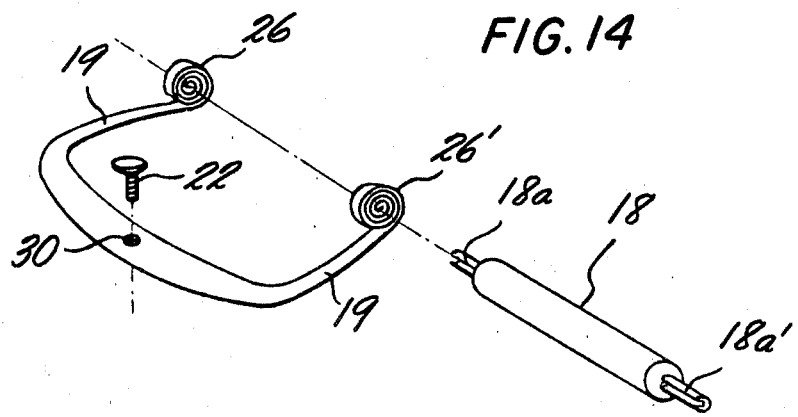
FIG. 14 is an exploded perspective view illustrating the method of assembling the locking member of the device in FIG. 13.

FIGS. 11 and 12 illustrate other embodiments consisting of the restraint belt 4 and control belt 11 attached to the D-ring a manner similar to that described above, except that in these embodiments there is provided a friction element 26 which is a metallic or strong plastic shaped member, as illustrated in FIG. 10. The friction element 26 has engaging projections 28, 28 at both ends. The control belt loop passes through a slot 27 in friction member and the member 26 is normally secured above the bridge section 10d of Dring 10 by a rivet 29. The surface of the friction member 26 that contacts the restraint belt 4 is roughened to increase the frictional resistance of the surface 26 against the restraint belt 4.

Under normal circumstances, as illustrated in FIG. 11, the sliding motion of the belt 4 is not interferred with, the lock remaining in a releasing position. In the event of an emergency that thrusts the upper body of the occupant forcibly forward against the belt and thereby subjects the shoulder belt section 4a to tension forces in the direction of the arrow in FIG. 12, the rivet 29 is broken, thereby releasing the friction member 26 and allowing it to move into the restraint belt opening 10', whereupon the restraint belt 4 is frictionally engaged by the roughened surface of the friction member 26. The movement of the lap belt section 4b toward the shoulder belt section 4a is prevented, in turn restraining the movement of the upper body of the occupant.

As shown in FIGS. 13 to 17, the lock member may also be a cylindrical roller having a shaft with two axially terminal projections 18a, 18a', the roller lock member 18 being connected to the D-ring 10 by a connector 19. The connector 19 is U-shaped and generally conforms to the end section 10c of the D-ring. The connector is resilient and includes spiral spring ends 26, 26' at each end that rotatably receive the ends of the shaft of the lock member 18. The connector 19 is secured to the D-ring 10 by a screw 22 that passes through a hole 30 in the connector.

The direction of the spiral winding of the springs 26, 26' is such that when the lock member 18 is inserted into the control belt loop the control belt loop is held away from the reflex section 10a of the D-ring 10 through which the restraint belt 4 is looped to form the lap belt section 4b and shoulder belt section 4a, thus positioning the control belt loop and lock member 18 above the bridge 10d in the non-locking position as illustrated in FIG. 15.

It will be understood by those skilled in the art that a cylindrical coil shape spring placed inside the cylindrical roller lock member 18, or used as the lock member 18 itself, could be substituted for the spiral springs 26, 26'.

The operation of the lock member 18 occurs when tension is applied through the control belt 11, causing the lock member 18 to move to the restraint belt opening 10' between the reflex section 10a and the bridge section 10d of the D-ring 10, thus blocking the restraint belt opening 10', compressing and holding both belts 11, 4 between the lock member and the edges of the restraint belt opening 10'.

An advantage of this embodiment (FIGS. 13 to 17) over the above-described embodiments of FIGS. 2–12 is that the embodiments of FIGS. 2–12 require repairs to broken stitching or rivets, while the spring-type embodiment is restored by the resiliency of the connector and replaces the lock member 18 and the control belt loop to the non-locking position above the bridge 10d.

It will be understood by those skilled in the art that in addition to the substitution of a cylindrical coil shape spring for the spiral springs 26, 26' other variations may be made without departing from the spirit of the invention. For example, the lock member may have an elliptical cross section rather than a wedge-shape or circular cross section, and may be either smooth and finely finished, or roughened.

I claim:

1. In a vehicle occupant restraint belt system having a D-ring, a control belt, and a restraint belt, the D-ring including a reflex section partitioning the restraint belt into a shoulder belt section and a lap belt section by passing of the restraint belt through a restraint belt opening in the D-ring and reflexion of the restraint belt from one section to the other, two side sections being connected to each end of the reflex section, an end section at the end of the D-ring opposite the reflex section closing the side sections, and a bridge section bridging the two side sections and forming a restraint belt opening between the bridge section and the reflex section, and a control belt opening between the bridge section and the end section, the improvement of a restraint belt anti-slip device comprising a portion of the control belt being reflexed back on itself to define a U-shaped loop passing through the restraint belt opening in the D-ring, temporary holding means for temporarily holding the control belt loop away from the restraint belt opening in the non-locking position, and a lock member inserted into the control belt loop, the loop and lock member being transferable between a non-locking position and a locking position by tension forces applied through the control belt of a predetermined amount so as to overcome the means for temporarily holding the lock member in the non-locking position, so that when the lock member is in the locking position the lock member wedges in the restraint belt opening against the restraint belt and prevents the lap portion of the restraint belt from passing through the restraint belt opening to the shoulder belt portion.

2. The anti-slip device according to claim 1, wherein the means for temporarily holding the control belt loop and lock member includes tear-away temporary stitching holding the loop and lock member spaced apart from the restraint belt opening in the D-ring, said stitching being breakable by a predetermined tension force applied through the control belt.

3. The anti-slip device according to claim 1, and further comprising a V-shape friction element received on the control belt intermediate of the lock member and the restraint belt opening and having a roughened surface which frictionally engages the restraint belt when said lock member is in said locking position.

4. The anti-slip device according to claim 3, wherein the V-shape friction element is secured in the non-locking position to the D-ring by a breakable fastener.

5. The anti-slip device according to claims 1, 2, 3, or 4 wherein the lock member has a wedge-shape cross section.

6. The anti-slip device according to claims 1, 2, 3, or 4 wherein the locking member has a circular cross section.

7. The anti-slip device according to claims 1, 2, 3, 4, 5, or 6 wherein the outer surface of the lock member is roughened.

8. The anti-slip device according to claim 1, wherein the lock member comprises a roller having fastening means at both axially terminal ends and the temporary holding means includes spring means for urging said lock member away from the locking position toward the non-locking position.

9. The anti-slip device according to claim 8, wherein the spring means comprises spiral springs connected to the terminal ends of a connector means connected to the D-ring, said spiral springs being connected to said fastening means on the roller lock member.

* * * * *